(12) United States Patent
Chen

(10) Patent No.: US 7,516,930 B2
(45) Date of Patent: Apr. 14, 2009

(54) GARMENT HANGER ROD HOLDER

(75) Inventor: Henry Chen, Taipei (TW)

(73) Assignee: Protrend Co., Ltd., Taipei (TW)

( * ) Notice: Subject to any disclaimer, the term of this patent is extended or adjusted under 35 U.S.C. 154(b) by 241 days.

(21) Appl. No.: 11/403,892

(22) Filed: Apr. 14, 2006

(65) Prior Publication Data

US 2007/0241253 A1 Oct. 18, 2007

(51) Int. Cl.
*F16B 45/00* (2006.01)

(52) U.S. Cl. ................................. 248/304; 248/305

(58) Field of Classification Search ............ 248/690, 248/691, 692, 215, 304, 305, 306, 322, 339, 248/340, 341; 224/268, 269, 621, 666, 669; 211/106.01, 90.03, 119, 186, 181.1, 183; 223/DIG. 4
See application file for complete search history.

(56) References Cited

U.S. PATENT DOCUMENTS 2,565,719 A * 8/1951 Church ................ 248/215
5,531,416 A * 7/1996 Remmers ............... 248/222.51
7,093,812 B1 * 8/2006 Nordeen ..................... 248/304
7,252,274 B1 * 8/2007 Brannen ..................... 248/301
2006/0261230 A1 * 11/2006 Lee ............................ 248/304

* cited by examiner

*Primary Examiner*—A. Joseph Wujciak, III
(74) *Attorney, Agent, or Firm*—Troxell Law Office PLLC

(57) ABSTRACT

A garment hanger rod holder is configured for assembled to upper and lower horizontal metal bars at a front of a metal rack, and includes a main body and a movable member mounted to a rear side of the main body. The main body includes a top hook head for hooking to the upper horizontal metal bar at the front of the metal rack, and a supporting seat formed at a lower free end of the main body for firmly support a garment hanger rod thereon. The movable member defines a receiving space for engaging with the lower horizontal metal bar at the front of the metal rack. The movable member is upward and downward movable relative to the main body to thereby adjust the receiving space to different heights to overcome dimensions errors in the metal rack, and enables the rod holder to firmly assemble to the metal rack.

13 Claims, 11 Drawing Sheets

GARMENT HANGER ROD HOLDER

FIELD OF THE INVENTION

The present invention relates to a garment hanger rod holder, which is directly hooked to a metal rack by engaging with an upper and a lower horizontal metal bars at a front of the metal rack.

BACKGROUND OF THE INVENTION

A metal rack is frequently fixed to a wall surface for holding things, so that valuable space in a room could be fully utilized without the need of spending a lot of money for a custom-made cabinet or closet. The metal rack may be covered with curtains or drapes to define a closed storage space and serves as, for example, a cabinet, a closet, or a wardrobe. When the metal rack is used as a wardrobe, it is desirable a garment hanger rod may be fixed below the metal rack for holding some garment hangers.

FIG. 1 shows a conventional metal rack 90 that includes a vertically downward bent front to increase the structural strength of the metal rack 90, preventing the metal rack 90 from easy deformation. An upper and a lower horizontal metal bar 91, 92 are welded to an upper and a lower end, respectively, of the vertical front of the metal rack 90, such that a plurality of metal wires 93 forming the metal rack 90 are extended between the two horizontal metal bars 91, 92. FIG. 2 is an exploded perspective view of a conventional hanger 94 for use on the metal rack 90. The hanger 94 includes a box 95 provided at an upper end thereof and a supporting seat 96 connected to a lower free end thereof for supporting a crossbar 97 thereon (see FIG. 1). The box 95 includes an openable cover 98. Two lateral sidewalls of the box 95 are symmetrically provided with upper and lower recesses 951, 952 for the upper and the lower horizontal metal bars 91, 92 of the metal rack 90 to engage therewith before the cover 98 is closed to the box 95 with a screw and thereby locks the closed box 95 to the metal bars 91, 92 and connects the hanger 94 to the metal rack 90. The box 95 of the hanger 94 occupies a large volume and has complicate structure that necessitates relatively high manufacturing cost and causes inconveniences in connecting the hanger 94 to the metal rack 90.

U.S. Pat. No. 5,531,416 discloses a hanger having an upper edge adapted to hold to two metal wires on a top of a metal rack. The metal rack for use with the hanger disclosed in U.S. Pat. No. 5,531,416 must have two adjacent metal wires provided at a front end of the top of the metal rack, and is therefore inconvenient for use.

Generally, the metal rack is manufactured with low accuracy requirement, and it tends to have minor error in the space between two adjacent metal wires forming the metal rack. However, a position on the hanger for associating with the metal wires of the metal rack has fixed dimensions. Therefore, it is possible the hanger could not be easily connected to the metal rack because it has fixed dimensions that might not match the metal rack that has errors in the size thereof.

It is therefore tried by the inventor to develop a garment hanger rod holder to eliminate the drawback in the conventional hanger of FIG. 2 that must be mounted to the metal rack using screws, and overcome the problem of being unable to match a low-accuracy metal rack as encountered by the hanger disclosed in U.S. Pat. No. 5,531,416.

SUMMARY OF THE INVENTION

A primary object of the present invention is to provide a garment hanger rod holder that could be directly hooked to a front of a metal rack for supporting a garment hanger rod thereon, and is therefore more convenient for use.

Another object of the present invention is to provide a garment hanger rod holder for hooking to a front of a metal rack, wherein a vertical distance between two positions of the rod holder for hooking to the metal rack is adjustable to overcome dimensional errors in the metal rack.

To achieve the above and other objects, the garment hanger rod holder of the present invention includes a main body and a movable member upward and downward movably mounted to a rear side of the main body. The main body includes a top hook head for hooking to an upper horizontal metal bar at the front of the metal rack, and a supporting seat formed at a lower free end of the main body for firmly support a garment hanger rod thereon. The movable member defines at least one receiving space for engaging with a lower horizontal metal bar at the front of the metal rack. With the hook head of the main body and the receiving space of the movable member engaged with the upper and the lower horizontal metal bar of the metal rack, respectively, the rod holder is firmly assembled to the metal rack.

An upper part of the rod holder of the present invention is provided with a vertical slit for engaging with a vertical metal bar at the front of the metal rack, so that the rod holder is prevented from moving laterally relative to the metal rack.

In the rod holder of the present invention, when the hook head of the main body is oriented to a front side of the metal rack, the receiving space on the movable member is preferably oriented to a rear side of the metal rack.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 5:
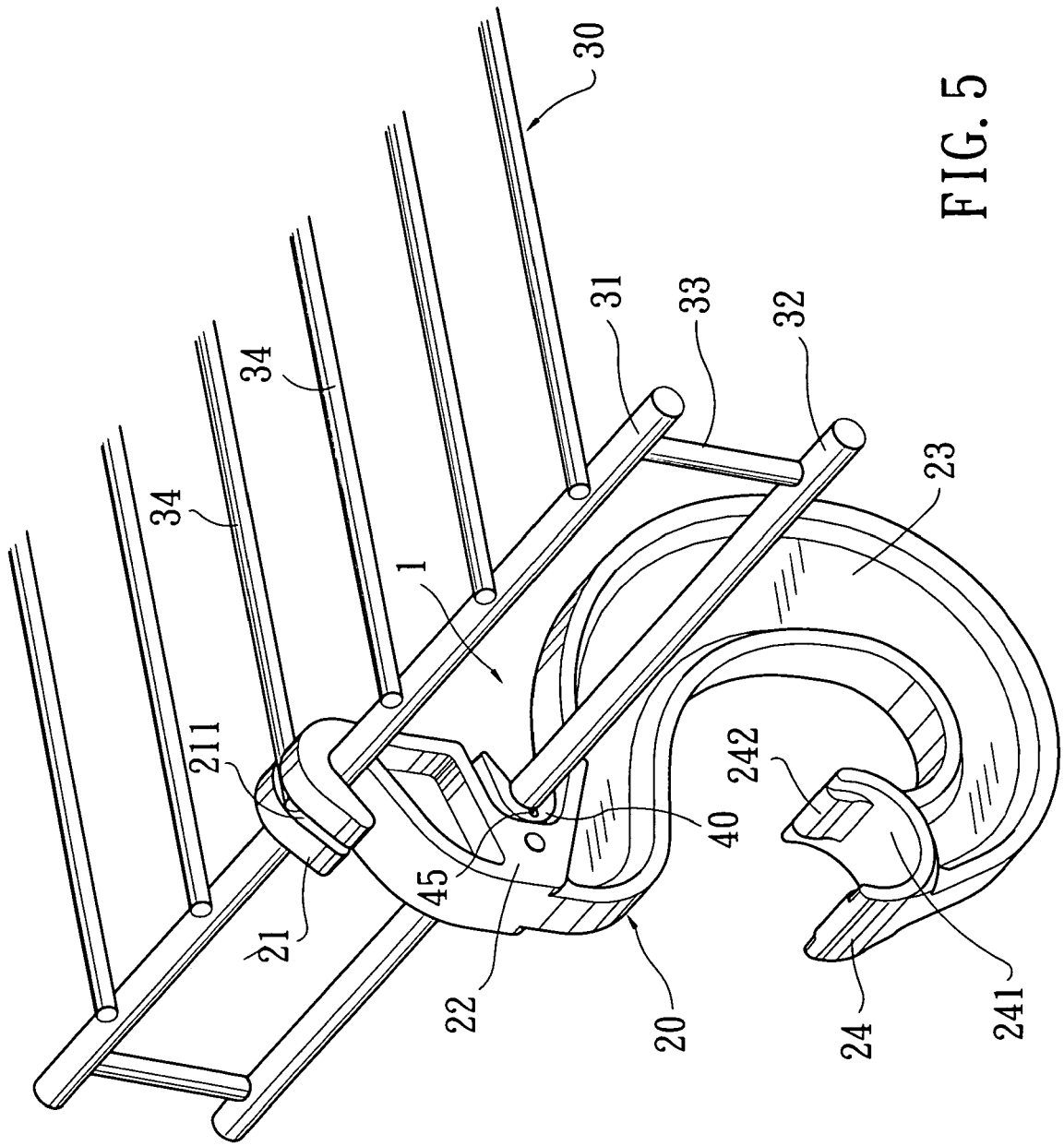
FIG. 5 is a perspective view showing the use of the garment hanger rod holder of FIG. 3 on a metal rack.

Please refer to FIG. 5 that shows a garment hanger rod holder 1 according to a preferred embodiment of the present invention configured for assembling to a metal rack 30. The metal rack 30 includes a horizontal top and a vertical front. The front is formed from two spaced horizontal metal bar, namely, an upper and a lower horizontal metal bar 31, 32, and a plurality of spaced short metal bars 33 vertically extended between the upper and lower horizontal metal bars 31, 32 to connect them to each other. The top of the metal rack 30 is formed from a plurality of parallelly spaced metal wires 34 extended in a direction perpendicular to the upper and lower horizontal metal bars 31, 32 at the front of the metal rack 30.

Figure 1:
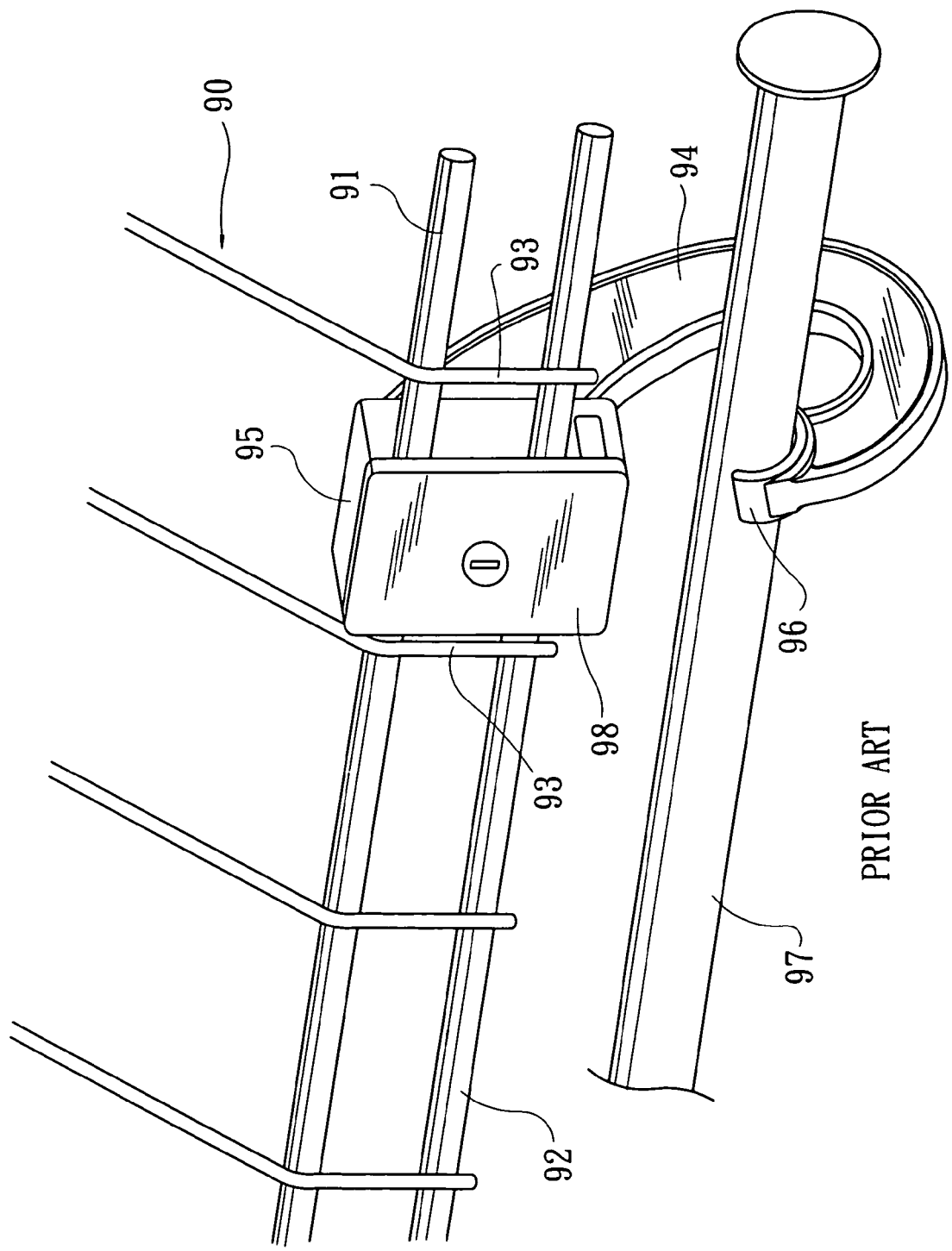
FIG. 1 is a perspective view showing the use of a conventional hanger on a metal rack.
Figure 2:
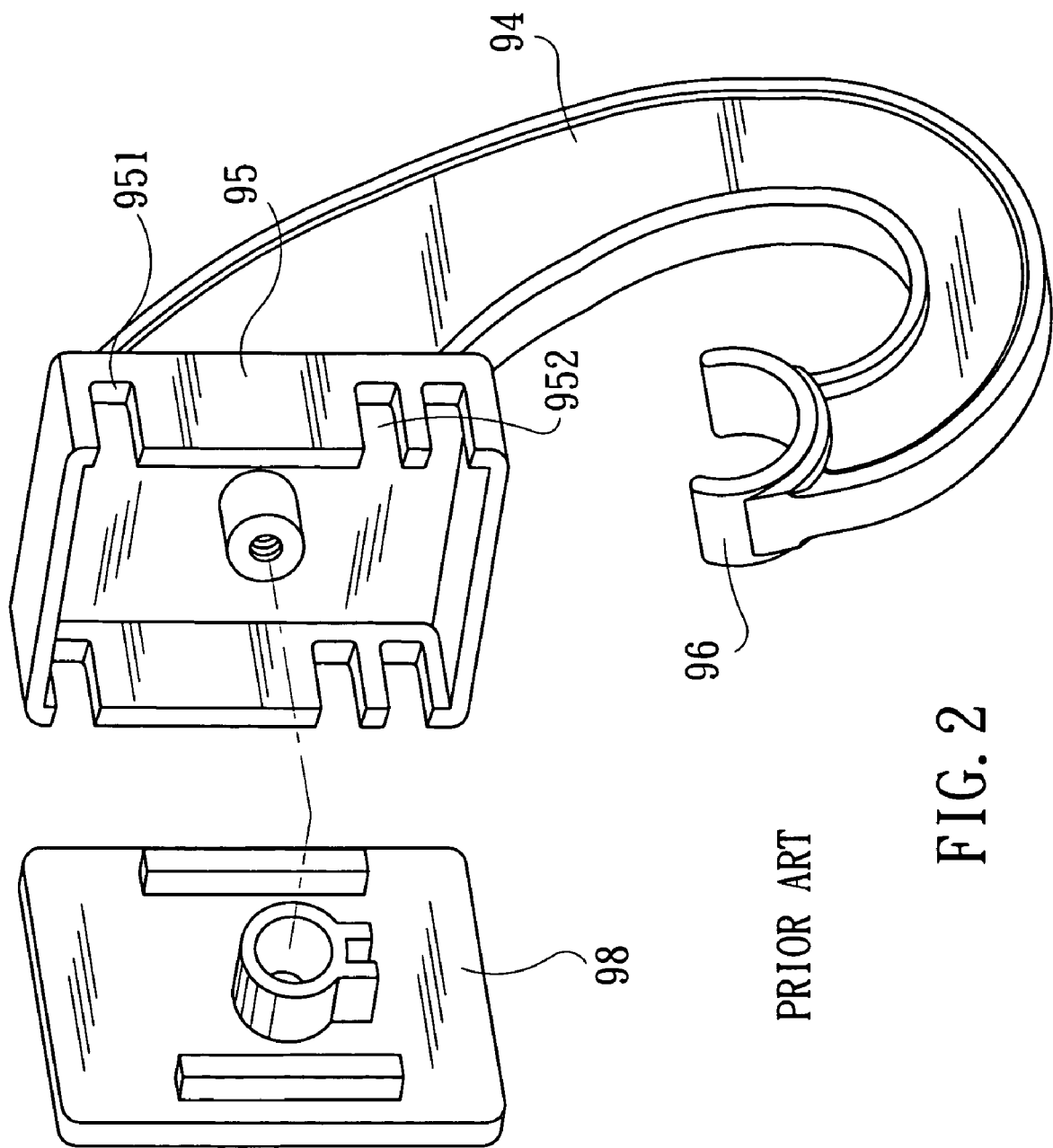
FIG. 2 is an exploded perspective view of the conventional hanger of FIG. 1.
Figure 3:
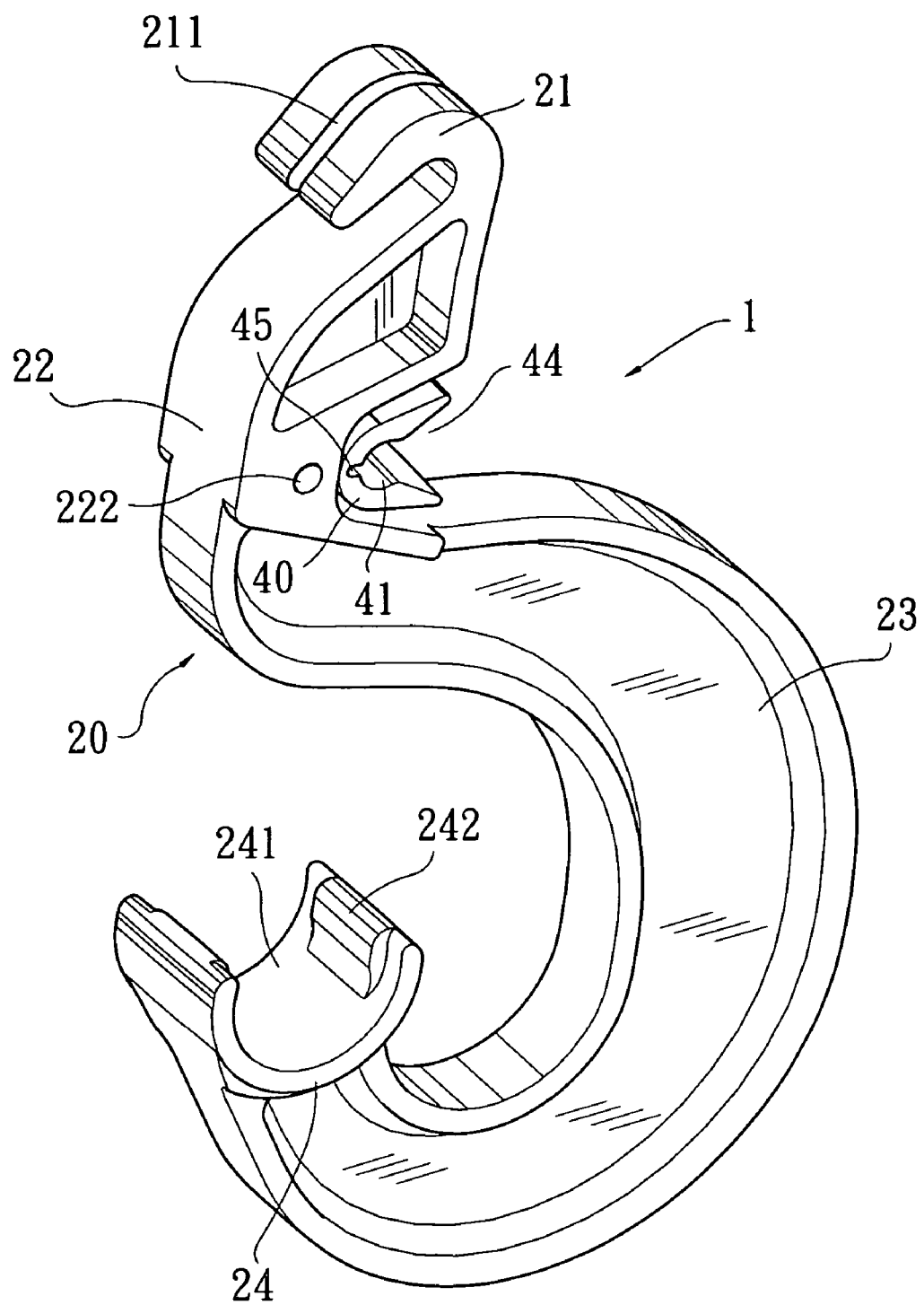
FIG. 3 is an assembled perspective view of a garment hanger rod holder according to a preferred embodiment of the present invention.
Figure 4:
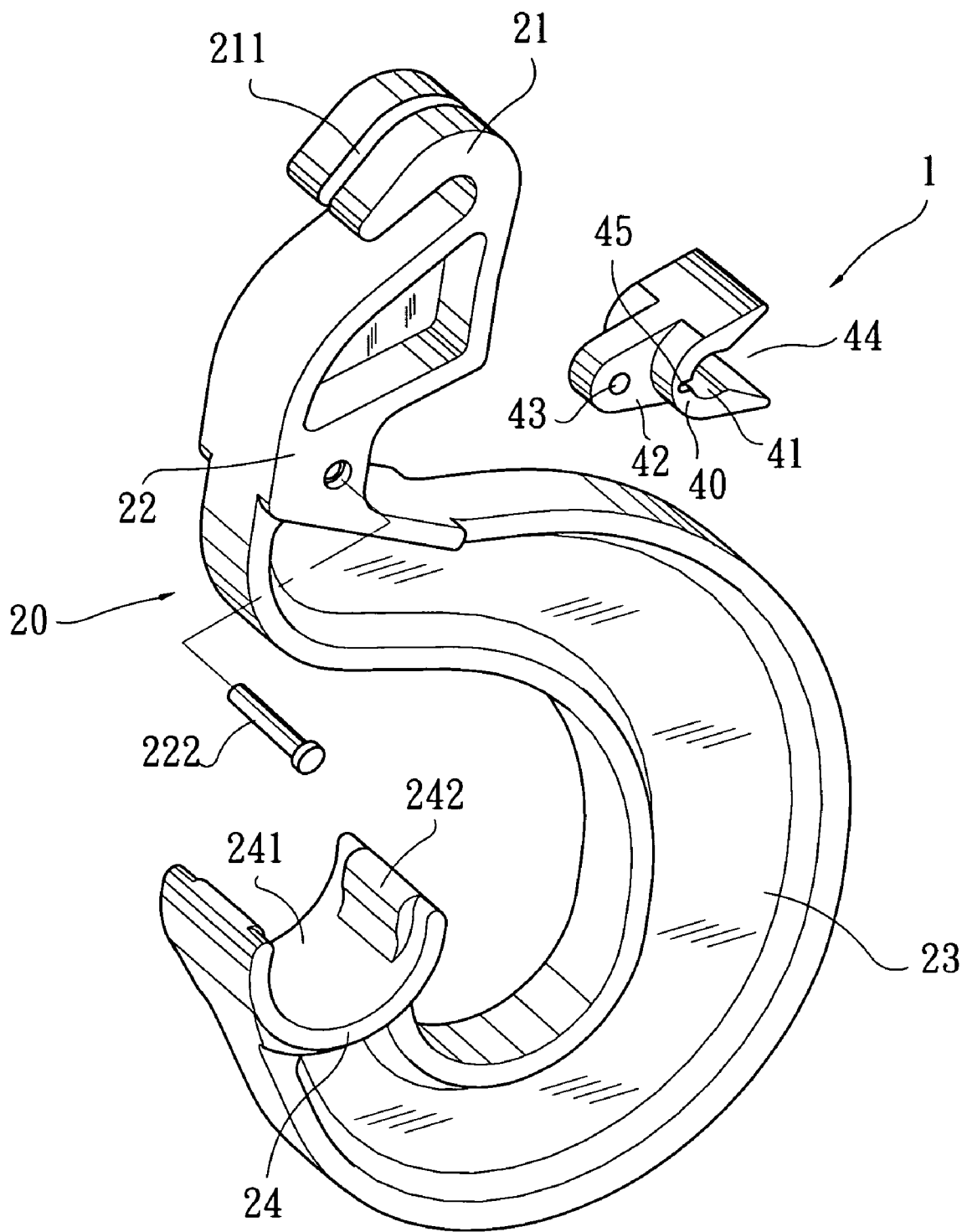
FIG. 4 is an exploded view of FIG. 3.

Please also refer to FIGS. 3 and 4 that are assembled and exploded perspective views, respectively, of the garment hanger rod holder 1, which is also briefly referred to as the rod holder 1 throughout the specification and the appended claims. As shown, the rod holder 1 includes a main body 20 and a movable member 40. The main body 20 includes a hook head 21, a neck portion 22, a curved arm 23, and a supporting seat 24. The hook head 21 is located at an upper end of the main body 20 for hooking to the upper horizontal metal bar 31 at the front of the metal rack 30. The neck portion 22 is integrally formed below the hook head 21, and the movable member 40 is assembled to a rear side of the neck portion 22. The curved arm 23 is integrally downward extended from the neck portion 22, and the supporting seat 24 is integrally formed at a free end of the curved arm 23. The supporting seat 24 defines a transverse horizontal recess 241 having an open top for a garment hanger rod 50 to press fit therein, as shown in FIGS. 6 and 7.

The movable member 40 is connected to a rear side of the neck portion 22 of the main body 20 to swing upward and downward relative to the neck portion 22, and defines a receiving space 41 for engaging with the lower horizontal metal bar 32 at the front of the metal rack 30. With the hook head 21 of the rod holder 1 and the receiving space 41 of the movable member 40 are engaged with the upper and the lower horizontal metal bar 31, 32, respectively, the whole rod holder 1 may be firmly connected to the metal rack 30, as shown in FIGS. 5 and 6. As can be seen from FIG. 7, a garment hanger rod 50 may be supported on two or more rod holders 1 in a horizontal or near horizontal state.

Figure 6:
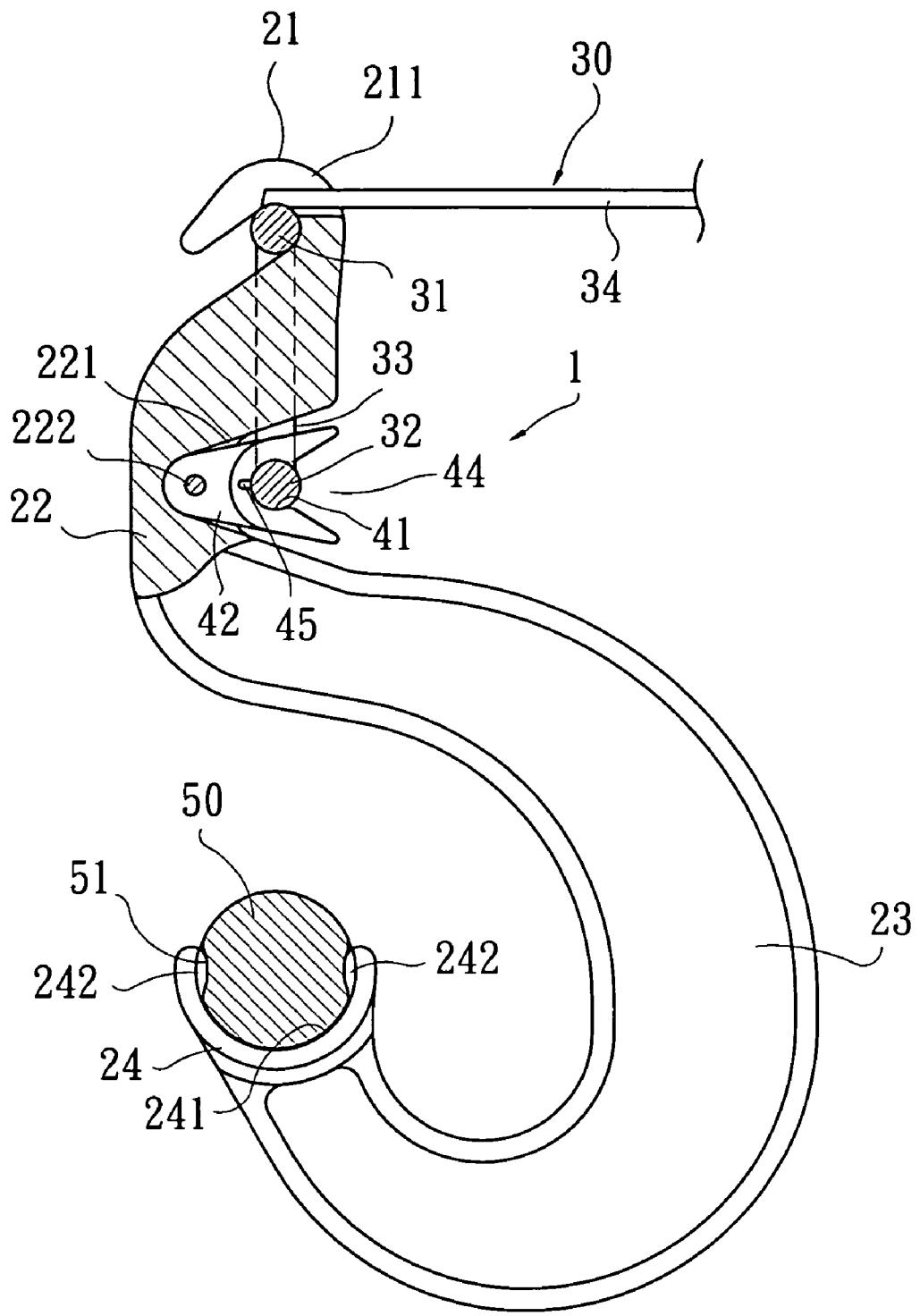
FIG. 6 is a sectioned side view showing the use of the garment hanger rod holder of FIG. 3 on a metal rack.
Figure 7:
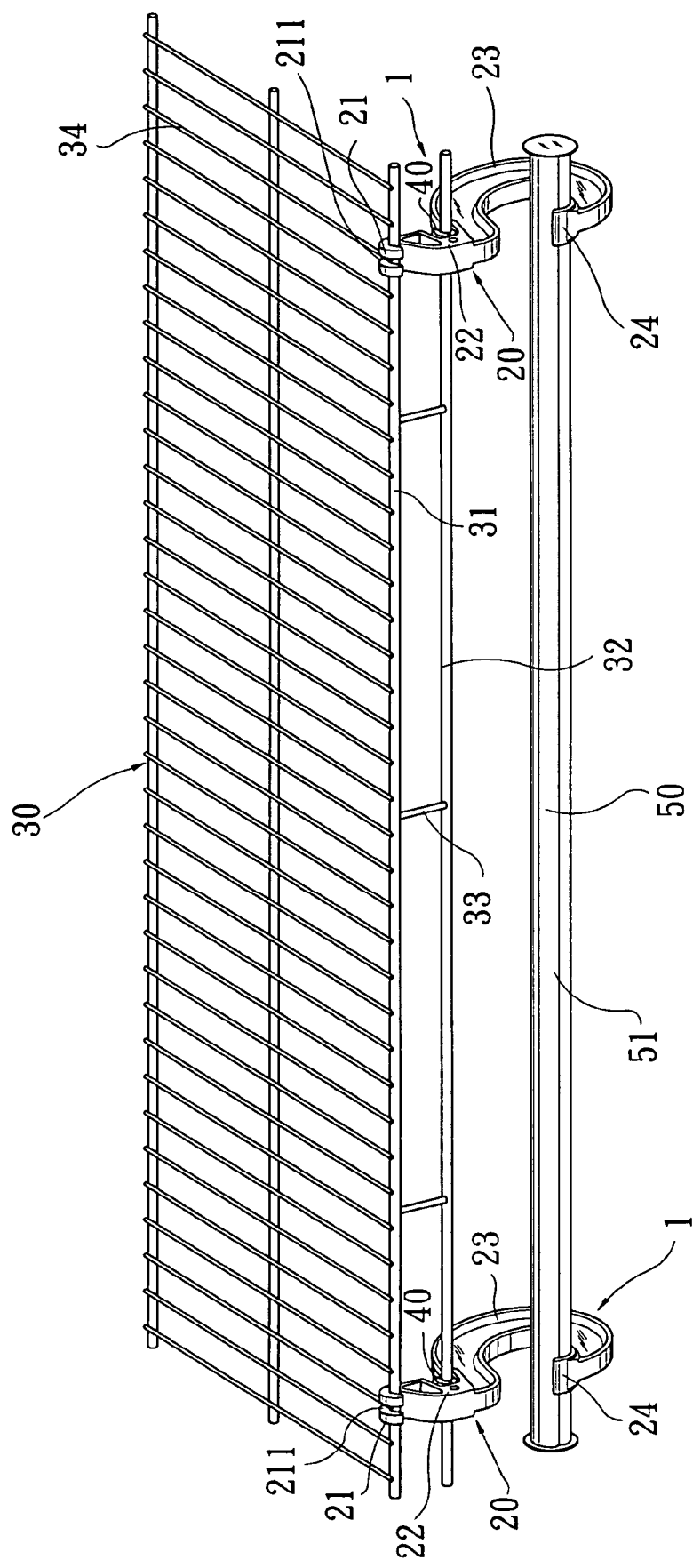
FIG. 7 is a perspective view showing a plurality of the garment hanger rod holders of FIG. 3 are connected to a metal rack to support a garment hanger rod thereon.

As can be seen from FIG. 6, which is a partially sectioned side view showing the connection of the rod holder 1 to the metal rack 30, the neck portion 21 on the main body 20 is provided at the rear side with a vertically extended groove 221; and as can be seen from FIG. 4, the movable member 40 includes an integrally formed lug 42, which has a transverse through hole 43 provided thereat. The lug 42 of the movable member 40 is adapted to extend into the vertical groove 221 and be held thereto by a pin 222 extended through the neck portion 22 and the through hole 43 on the lug 42, so that the movable member 40 is pivotally connected to the main body 20 to upward and downward swing about the pin 222, enabling the receiving space 41 to shift to different heights. Since the metal rack 30 is usually produced with low accuracy, there might be minor errors in the vertical distance between the upper and the lower horizontal metal bar 31, 32. However, with the movable member 40, such minor errors in the vertical distance between the upper and the lower horizontal metal bar 31, 32 may be overcome when the receiving space 41 is pivotally swung about the pin 222 to a different height.

The movable member 40 also defines a rearward guiding mouth 44 at an outer side of and communicating with the receiving space 41. The lower horizontal metal bar 32 is guided by the guiding mouth 44 into the receiving space 41. The guiding mouth 44 is vertically gradually expanded from an inner to an outer side with an outer height thereof larger than an outer diameter of the metal bar 32 and an innermost height slightly smaller than the outer diameter of the metal bar 32. With this configuration, the metal bar 32 may be easily aligned with the expanded guiding mouth 44 and moved toward the receiving space 41 of the movable member 40. When the metal bar 32 is moved to an inner end of the guiding mouth 44, the guiding mouth 44 is forced by the metal bar 32 to open wider, allowing the metal bar 32 to be press fitted in the receiving space 41. The metal bar 32 received in the receiving space 41 is stopped by the small inner end or height of the guiding mouth 44 from easily moving out of the receiving space 41. A transverse groove 45 having a predetermined size may be further provided at an inner end of the receiving space 41, so that the guiding mouth 44 may be more easily forced open by the metal bar 32.

Please refer to FIG. 6. The receiving space 41 of the movable member 40 is located directly below the hook head 21 of the main body 20, and the supporting seat 24 is located directly below the receiving space 41. With these arrangements, the rod holder 1 may be uprightly assembled to the metal rack 30. Since the supporting seat 24 for carrying load is located directly below the hook head 21 and the receiving space 41, the rod holder 1 is able to maintain upright without separating from the metal rack 30 when the garment hanger rod 50 is supported thereon. The curved arm 23 is provided to enable the supporting seat 24 to locate directly below the receiving space 41.

To assemble the rod holder 1 to the metal rack 30, first hook the hook head 21 of the main body 20 to the upper horizontal metal bar 31 from a rear side of the metal bar 31, and vertically turn the rod holder 1 about the metal bar 31 for the guiding mouth 44 of the receiving space 41 on the movable member 40 to align with the lower horizontal metal bar 32 of the metal rack 30, and force the receiving space 41 against the metal bar 32 to engage with the latter, so that the rod holder 1 is firmly assembled to the metal rack 30.

The garment hanger rod 50 may be press fitted in the transverse horizontal recess 241 defined by the supporting seat 24 on the rod holder 1 and supported on the supporting seat 24. When being supported on the supporting seats 24 of two or more rod holders 1, the garment hanger rod 50 is in a horizontal or near horizontal position. It is noted at least one protrusion 242 is provided on an inner wall of the transverse horizontal recess 241, and the garment hanger rod 50 is provided at a position corresponding to the protrusion 242 with a notch 51. When the garment hanger rod 50 is press fitted in the horizontal recess 241, the protrusion 242 engages with the notch 51 to prevent the rod 50 from easily moving out of the transverse horizontal recess 241.

The hook head 21 of the main body 20 is formed of a vertical slit 211 to split the hook head 21 into two lateral halves. In assembling the rod holder 1 to the metal rack 30 as described above, the hook head 21 is hooked to the upper horizontal metal bar 31 with the vertical slit 211 aligned with one of the metal wires 34 forming the horizontal top of the metal rack 30, as shown in FIG. 7. With the metal wire 34 located in the slit 211, the rod holder 1 is prevented from moving laterally on the metal rack 30.

In addition to the metal rack 30 as shown in FIGS. 5 and 7, there is still another type of metal rack 60 available in the market. Please refer to FIG. 10. The metal rack 60 also includes a horizontal top formed from a plurality of parallelly spaced horizontal metal wires 64. Front ends of the horizontal metal wires 64 are bent downward by 90° to form a plurality of vertical metal wire sections 63. An upper and a lower transverse horizontal metal bar 61, 62 are connected to an upper and a lower end, respectively, of the vertical metal wire sections 63 to form a vertical front of the metal rack 60.

Presently, there are two different heights available for the vertical front of the metal rack 60. The rod holder 1 according to the preferred embodiment of the present invention could be assembled to only one of the two types of the metal rack 60. In other words, a rod holder 1 having a different specification must be manufactured to match the other type of the metal rack 60.

Figure 8:
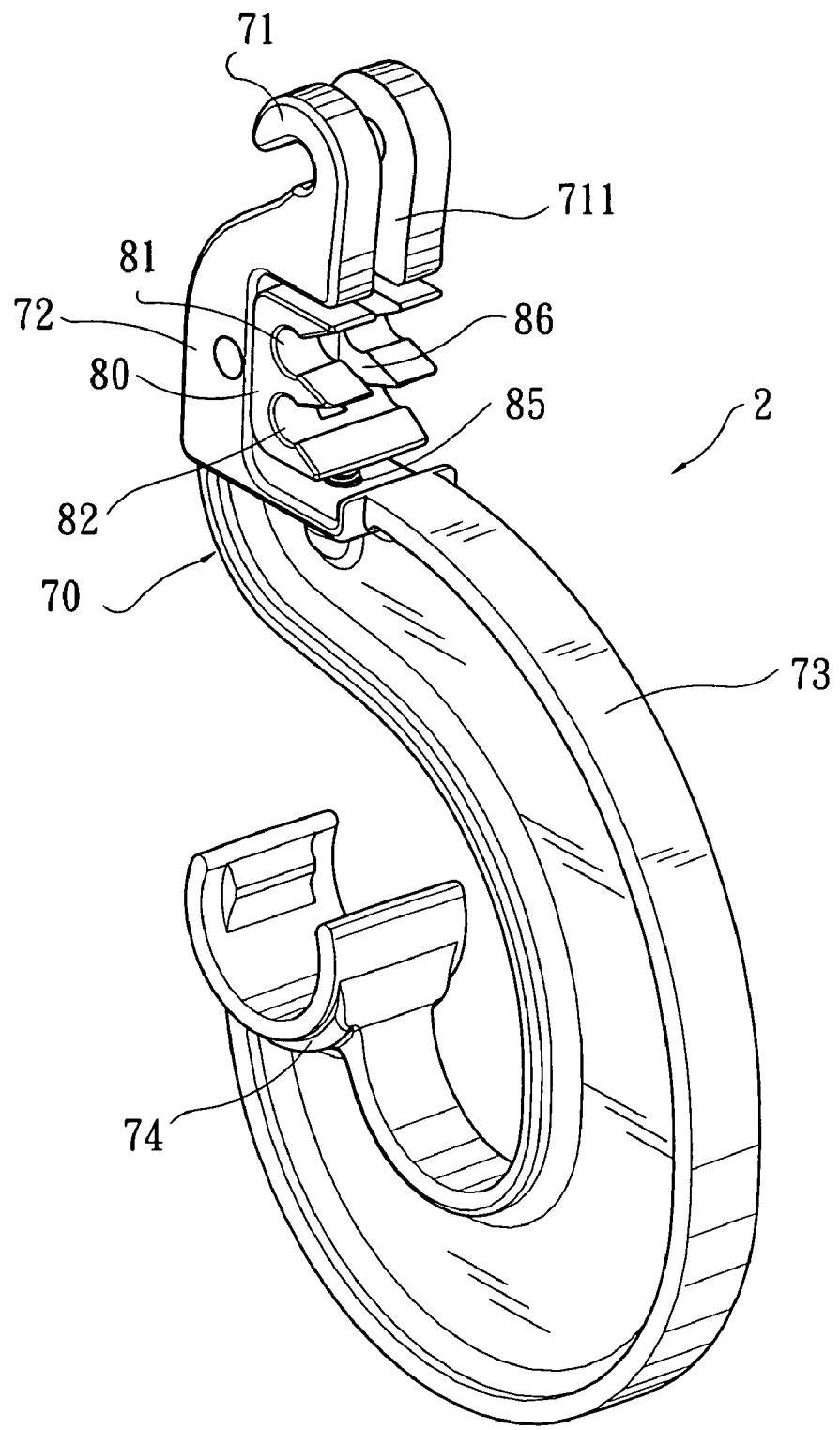
FIG. 8 is an assembled perspective view of a garment hanger rod holder according to another embodiment of the present invention.
Figure 9:
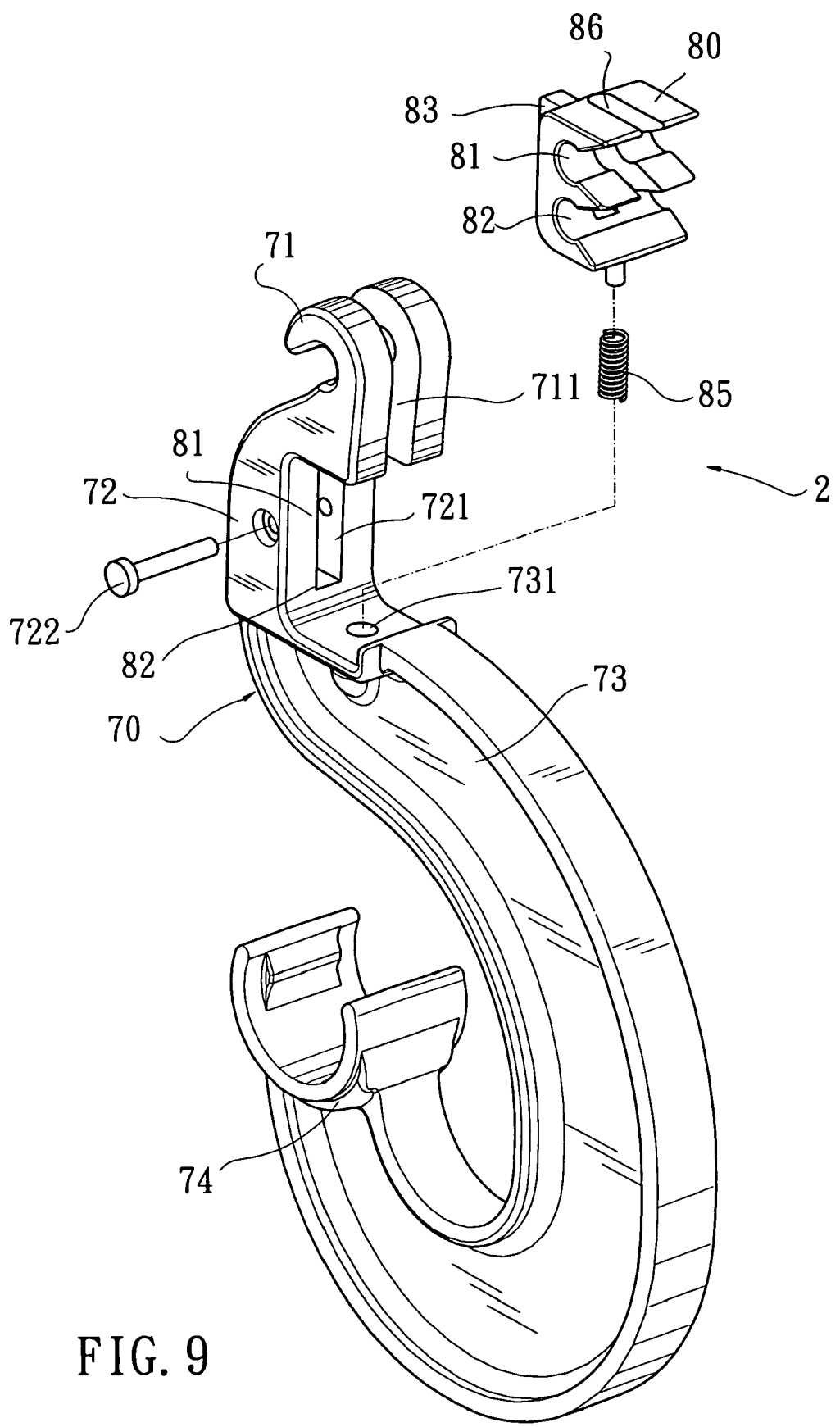
FIG. 9 is an exploded view of FIG. 8.
Figure 10:
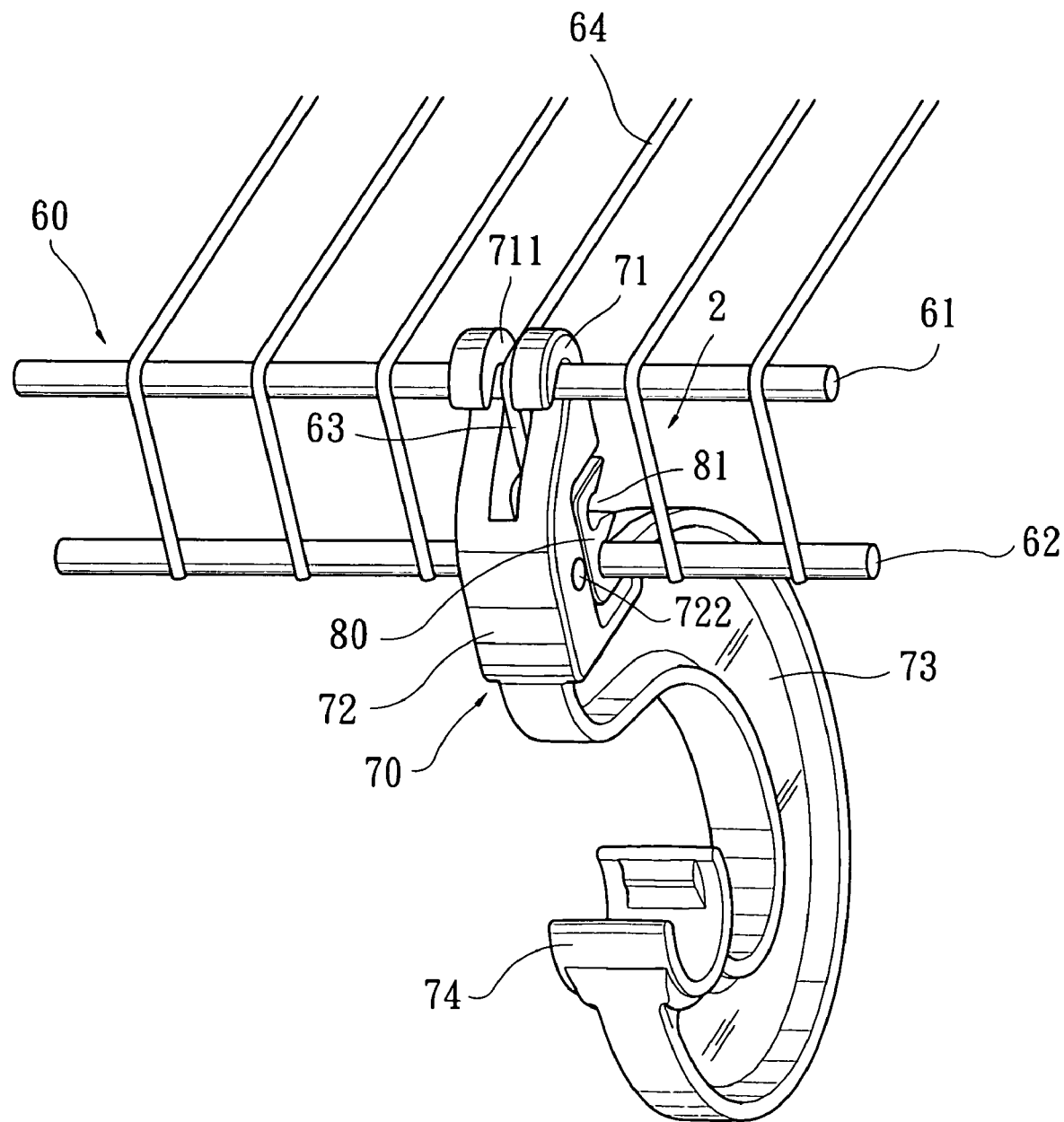
FIG. 10 is a perspective view showing the use of the garment hanger rod holder of FIG. 8 on a metal rack.
Figure 11:
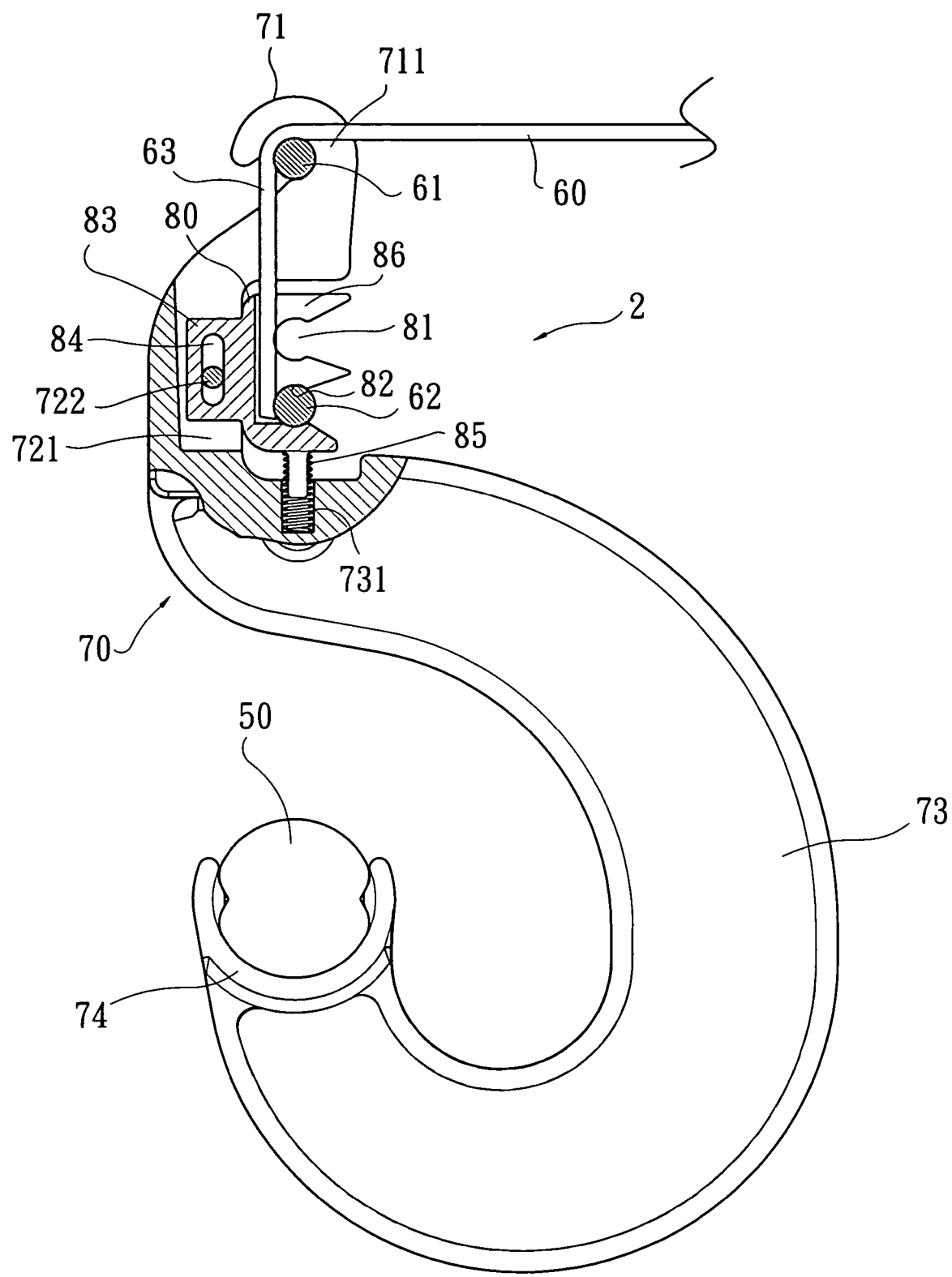
FIG. 11 is a sectioned side view showing the use of the garment hanger rod holder of FIG. 8 on a metal rack.

Please refer to FIGS. 8 and 9 that are assembled and exploded perspective views, respectively, of a garment hanger rod holder 2 according to another embodiment of the present invention that may be assembled to both types of the metal rack 60; and to FIGS. 10 and 11 that are perspective and partially sectioned side views, respectively, showing the rod holder 2 assembled to the metal rack 60. As shown, the rod hanger 2 includes a main body 70 and a movable member 80. The main body 70 includes a hook head 71, a neck portion 72, a curved arm 73, and a supporting seat 74. The hook head 71 is hooked to the upper horizontal metal bar 61 of the metal rack 60, as shown in FIGS. 10 and 11. The movable member 80 is movably connected to a rear side of the neck portion 72 of the main body 70, and is provided with two vertically spaced receiving spaces, namely, an upper receiving space 81 and a lower receiving space 82. With one of the two receiving spaces 81, 82 engaged with the lower horizontal metal bar 62 at the front of the metal rack 60, the rod holder 2 may be firmly assembled to the metal rack 60.

The neck portion 72 of the main body 70 is provided at the rear side with a vertically extended groove 721, and the movable member 80 includes an integrally formed lug 83, which has along through hole 84 provided there at. The lug 83 of the movable member 80 is adapted to extend into the vertical groove 721 and be held thereto by a pin 722 extended through the neck portion 72 and the long through hole 84 on the lug 83, so that the movable member 80 is movably connected to the main body 70 to upward and downward slide along the long through hole 84, enabling the receiving spaces 81, 82 to shift to different heights. A compression spring 85 is mounted below the movable member 80 with a lower end of the compression spring 85 inserted in a recess 731 provided on a top of the curved arm 73 of the main body 70, so that the movable member 80 is normally pushed by the compression spring 85 to a high position.

The hook head 71 of the main body 70 includes a vertical slit 711 to divide the hook head 71 into two lateral halves. The movable member 80 also includes a vertical slit 86, which is aligned with the vertical slit 711 of the hook head 71 when the movable member 80 is fixed to the rear side of the neck portion 72. The vertical slit 86 downward extends from a top of the movable member 80 to a lower inner bottom of the movable member 80. To assemble the rod holder 2 to the metal rack 60, first align the vertical slits 711 and 86 with one of the vertical metal wire sections 63 at the front of the metal rack 60. When the rod holder 2 has been assembled to the metal rack 60 in the same manner as the rod holder 1 to the metal rack 30, the rod holder 2 is prevented by the vertical metal wire section 63 from moving laterally relative to the metal rack 60.

The garment hanger rod holders 1, 2 of the present invention could be easily assembled to the metal racks 30, 60 to meet the consumers' requirement for convenience in use. Moreover, the rod holders 1, 2 may automatically adjust the heights of the receiving spaces 41, 81, 82 in response to the dimensional errors in the metal racks 30, 60, and are firmly located in place once they are assembled to the metal racks 30, 60. Therefore, the garment hanger rod holder of the present invention is practical for use.

What is claimed is:

1. A garment hanger rod holder for assembling to a metal rack having a front with two vertically spaced upper and lower horizontal metal bars, comprising:
    a main body, which includes:
    (a) a hook head forming a top of said main body for hooking to said upper horizontal metal bar of said metal rack;
    (b) a neck portion integrally extended downward from said hook head;
    (c) a curved arm integrally extended downward from said neck portion; and
    (d) a supporting seat integrally formed on a free end of said curved arm; said supporting seat defining a transverse open-top horizontal recess for a garment hanger rod to press fit therein; and
    a movable member vertically defining at least one receiving space; said movable member being movably connected to a rear side of said neck portion of said main body to move upward and downward relative to said main body, so that a height of said at least one receiving space could be finely adjusted relative to said hook head of said main body to fitly engage with said lower horizontal metal bar of said metal rack,
    wherein said neck portion of said main body is provided at the rear side with a vertically extended groove, and said movable member is formed of a lug, which has a transverse through hole provided thereat; said lug of said movable member being inserted in said vertical groove on said neck portion and held thereto by a pin extended through said neck portion and said through hole on said lug.

2. The garment hanger rod holder as claimed in claim 1, wherein said movable member further defines a guiding mouth at an outer side of and communicating with each said receiving space for guiding said lower horizontal metal bar of said metal rack into said receiving space; said guiding mouth being vertically gradually expanded from an inner to an outer side with an outer height of said guiding mouth larger than an outer diameter of said lower horizontal metal bar and an innermost height slightly smaller than the outer diameter of said lower horizontal metal bar.

3. The garment hanger rod holder as claimed in claim 1, wherein said at least one receiving space is located directly below said hook head of said main body.

4. The garment hanger rod holder as claimed in claim 1, wherein said supporting seat is located directly below said at least one receiving space of said movable member.

5. The garment hanger rod holder as claimed in claim 1, wherein said hook head of said main body is formed of a vertical slit to divide said hook head into two lateral halves.

6. A garment hanger rod holder for assembling to a metal rack having a front with two vertically spaced upper and lower horizontal metal bars, comprising:
    a main body, which includes:
    (a) a hook head forming a top of said main body for hooking to said upper horizontal metal bar of said metal rack;
    (b) a neck portion integrally extended downward from said hook head;
    (c) a curved arm integrally extended downward from said neck portion; and
    (d) a supporting seat integrally formed on a free end of said curved arm; said supporting seat defining a transverse open-top horizontal recess for a garment hanger rod to press fit therein; and
    a movable member vertically defining at least one receiving space; said movable member being movably connected to a rear side of said neck portion of said main body to move upward and downward relative to said main body, so that a height of said at least one receiving space could be finely adjusted relative to said hook head of said main body to fitly engage with said lower horizontal metal bar of said metal rack, wherein said neck portion of said main body is provided at the rear side with a vertically extended groove, and said movable member is formed of a lug, which has a horizontal long through hole provided thereat; said lug of said movable member being inserted in said vertical groove on said neck portion and held thereto by a pin extended through said neck portion and said long through hole on said lug.

7. The garment hanger rod holder as claimed in claim 6, further comprising a compression spring mounted below said movable member with a lower end of said compression spring inserted in a recess formed at a top of said curved arm of said main body.

8. The garment hanger rod holder as claimed in claim 6, wherein said movable member further defines a guiding mouth at an outer side of and communicating with each said receiving space for guiding said lower horizontal metal bar of said metal rack into said receiving space; said guiding mouth being vertically gradually expanded from an inner to an outer side with an outer height of said guiding mouth larger than an outer diameter of said lower horizontal metal bar and an innermost height slightly smaller than the outer diameter of said lower horizontal metal bar.

9. The garment hanger rod holder as claimed in claim 6, wherein said at least one receiving space is located directly below said hook head of said main body.

10. The garment hanger rod holder as claimed in claim 6, wherein said supporting seat is located directly below said at least one receiving space of said movable member.

11. The garment hanger rod holder as claimed in claim 6, wherein said hook head of said main body is formed of a vertical slit to divide said hook head into two lateral halves.

12. A garment hanger rod holder for assembling to a metal rack having a front with two vertically spaced upper and lower horizontal metal bars, comprising:
 a main body, which includes:
 (a) a hook head forming a top of said main body for hooking to said upper horizontal metal bar of said metal rack;
 (b) a neck portion integrally extended downward from said hook head;
 (c) a curved arm integrally extended downward from said neck portion; and
 (d) a supporting seat integrally formed on a free end of said curved arm; said supporting seat defining a transverse open-top horizontal recess for a garment hanger rod to press fit therein; and
 a movable member vertically defining at least one receiving space; said movable member being movably connected to a rear side of said neck portion of said main body to move upward and downward relative to said main body, so that a height of said at least one receiving space could be finely adjusted relative to said hook head of said main body to fitly engage with said lower horizontal metal bar of said metal rack, wherein said hook head of said main body is formed of a vertical slit to divide said hook head into two lateral halves; and said movable member is also formed of a vertical projection aligned with said vertical slit on said hook head.

13. The garment hanger rod holder as claimed in claim 12, wherein said vertical projection on said movable member downward extends from a top of said movable member to an inner bottom of said movable member.

\* \* \* \* \*